(12) United States Patent
Hartmann et al.

(10) Patent No.: US 11,718,330 B2
(45) Date of Patent: Aug. 8, 2023

(54) CONTROLLED ROOF DRAINAGE VIA THE BELLOWS

(71) Applicant: Bombardier Transportation GmbH, Berlin (DE)

(72) Inventors: Stefan Hartmann, Vienna (AT); Christian Scheibenreif, Vienna (AT); Maximilian Krapp, Vienna (AT)

(73) Assignee: Bombardier Transportation GmbH, Berlin (DE)

(*) Notice: Subject to any disclaimer, the term of this patent is extended or adjusted under 35 U.S.C. 154(b) by 0 days.

(21) Appl. No.: 17/558,813

(22) Filed: Dec. 22, 2021

(65) Prior Publication Data

US 2022/0204058 A1 Jun. 30, 2022

(30) Foreign Application Priority Data

Dec. 28, 2020 (EP) .................................. 20217464

(51) Int. Cl.
| | | |
|---|---|---|
| *B61D 17/22* | (2006.01) | |
| *B61D 17/14* | (2006.01) | |
| *B62D 25/07* | (2006.01) | |
| *B61D 17/20* | (2006.01) | |
| *B62D 25/24* | (2006.01) | |
| *B60J 10/25* | (2016.01) | |

(52) U.S. Cl.
CPC ............ *B61D 17/22* (2013.01); *B61D 17/14* (2013.01); *B61D 17/20* (2013.01); *B62D 25/07* (2013.01); *B60J 10/25* (2016.02); *B62D 25/24* (2013.01)

(58) Field of Classification Search
CPC .................................. B60J 10/25; F16L 11/22
USPC ....................................... 105/8.1, 18; 280/403
See application file for complete search history.

(56) References Cited

U.S. PATENT DOCUMENTS

| | | | | |
|---|---|---|---|---|
| 1,143,734 A | * | 6/1915 | Sherwood | B61D 17/20 105/16 |
| 1,709,025 A | * | 4/1929 | Koch | B61D 17/20 105/4.1 |
| 3,143,827 A | * | 8/1964 | Showalter, Sr. | E04H 6/025 52/95 |
| 6,196,132 B1 | * | 3/2001 | Hubner | B60D 5/003 105/3 |
| 2017/0297638 A1 | * | 10/2017 | Tatzel | B61D 17/22 |

FOREIGN PATENT DOCUMENTS

| | | | | |
|---|---|---|---|---|
| CN | 201610140 U | * | 10/2010 | |
| EP | 2468600 A1 | * | 6/2012 | ............. B60D 5/003 |
| WO | 8001090 A1 | | 5/1980 | |

* cited by examiner

*Primary Examiner* — S. Joseph Morano
*Assistant Examiner* — James William Jones
(74) *Attorney, Agent, or Firm* — The Webb Law Firm

(57) ABSTRACT

A gangway bellow includes an outer bellow presenting corrugations forming a plurality of valleys presenting each a valley top portion facing upwardly and connected at each end to a valley top corner forming a junction between the valley top portion and a respective bellow side. The gangway bellow further includes at least one drainage channel so that liquid accumulating into at least one of the valley top portions flows through the at least one drainage channel along the respective bellow side.

11 Claims, 3 Drawing Sheets

CONTROLLED ROOF DRAINAGE VIA THE BELLOWS

CROSS-REFERENCE TO RELATED APPLICATION

This claims priority to European Patent Application No. 20217464.5 filed Dec. 28, 2020, the disclosure of which is hereby incorporated by reference in its entirety.

BACKGROUND OF THE INVENTION

Field of the Invention

The invention relates generally to the field of passenger cars construction, in particular to the field of streetcars and light rail vehicles.

Description of Related Art

More specifically, the invention relates to gangway bellows for interconnecting passenger cars, and the drainage of rainwater accumulating especially on the roof along the vehicle and on the gangway bellows.

In mainline vehicles like commuter passengers cars or light rail vehicles like metro cars, two adjacent railway cars are mechanically connected by couplers. Each of the adjacent railway cars presents a cantilever half bridge which form together a passage bridging the two adjacent cars for enabling passengers to move from a car to another. Bellows surrounding the cantilever half bridge are attached to each car so that, when the cars are connected, the bellows of the cars facing one another are pressed one against the other and form a closed gangway. Thereby, passengers can walk safely and in a relatively protected environment from one car to another even when the cars are traveling. Such gangway bellows are shown in patent EP 0 206 53 B1.

In multiarticulated street cars like tramways, the single cars or single modules are connected by articulation bearings. Compared to the precedent connection type, this connection can only be separated by removing several bolts. Therefore, the bellow is in one piece and is fixed, e.g. by bolts, on each end of one module.

Usually, gangway bellow forms a hood-like structure surrounding an opening at the front or rear-end of the passenger car through which passengers can move from one car to an adjacent car. The gangway bellow has corrugations made of parallel valleys and crests interleaved along a longitudinal axis of the car. This corrugated structure allows deformations of the gangway when the cars travel in a curved track section. However, rainwater falling on the gangway bellow and flowing from the car roof on the bellows accumulates in the valleys of the bellows and flows out of the bellow valleys in an uncontrolled manner. Thereby, passers-by next to the track and waiting passengers on the platform can get wet or dirty from running or splashing water.

Roof drainage can be controlled by gutter devices using hoses and pipes running in the interior of the car. Such gutter devices require additional installation space which can be used for hosting equipment achieving more important function or for improving passenger comfort. When these gutter devices run outside the car, they affect the shape of the car body which may impact external dimensions and esthetic of the car negatively.

SUMMARY OF THE INVENTION

Accordingly, an object of the present invention is to provide a top-down closed-guided roof drainage which does not impede the available internal volume or the external shape of the car.

For this purpose, it is proposed according to a first aspect of the invention a drainage channel for a gangway bellow presenting corrugations forming at least one valley presenting a valley top portion facing upwardly and at least one valley top corner, wherein the drainage channel is suitable for being located within said at least one valley top corner of said at least one valley and is operative to guide at least partially downwardly liquid accumulating within said valley top portion as it flows through said drainage channel.

Optionally, at least one top corner portion at one end suitable for being located into said at least one valley top corner of said gangway bellow, and a straight portion extending downwardly from said at least one top corner portion along at least part of a bellow side.

As a further option, said straight portion is located within at least part of a valley side portion facing outwardly and extending downwardly from said valley top portion along said bellow side.

Preferably, said drainage channel further comprises a bottom corner portion extending from a bottom end of said straight portion and suitable for being located within at least a portion of a valley bottom corner.

Optionally, at least one of the two free ends of said drainage channel is funneled.

Optionally, at least two top corner portions are connected to one straight portion through a manifold so that liquid accumulating on the respective valley top portions flows downwardly through said substantially straight portion along said bellow side.

Alternatively, one top corner portion is connected to a respective substantially straight portion so that liquid accumulating on a valley top portion of said gangway bellow flows downwardly through said bent top corner and said straight portion.

Optionally, said substantially straight portion is located within a valley side portion aligned with the respective valley top corner, said substantially straight portion being substantially vertically oriented.

According to a second aspect of the invention, it is proposed a gangway bellow comprising an outer bellow presenting corrugations forming a plurality of valleys presenting each a valley top portion facing upwardly and connected at each end to a valley top corner connecting one end of said valley top portion and a bellow side. The gangway bellow comprises at least one drainage channel so that liquid accumulating into at least one of the valley top portions flows through said at least one drainage channel and is directed at least partially downwardly along said respective bellow side.

Optionally, the at least one drainage channel comprises a top corner portion located within at least one of the valley top corners so that liquid accumulating into the respective valley top portion flows downwardly through said top corner portion along said respective bellow side.

As a further option, the at least one drainage channel comprises further a substantially straight portion connected to said top corner portion of the drainage channel and extending downwardly along said respective bellow side.

Optionally, said at least one drainage channel comprises further a bottom corner portion located at a bottom corner of the gangway bellow and connected to a bottom end of said straight portion of the drainage channel so that liquid accumulating into said valley top portion flows out from below the gangway bellow, and wherein, preferably, the upper end and/or the lower free end of said drainage channel is funneled.

Optionally, one drainage channel is located within each valley of the outer bellow from at least the upper part of the valley top corner, through a valley side portion extending downwardly along said respective bellow side, up to at least said bottom corner of the gangway bellow.

Optionally, one top corner portion is located in each valley top corner and several or all top corner portions of the gangway bellow is connected to one straight portion through a manifold portion; and/or said straight portion of the drainage channel is located on the outer bellow or between the outer bellow and an inner bellow.

According to a third aspect of the invention, it is proposed a passenger car comprising a gangway bellow as defined above and attached to a front and/or a rear part of the passenger car for connecting said passenger car to another passenger car.

BRIEF DESCRIPTION OF THE DRAWINGS

Other features and advantages of the present invention will emerge from the following description of embodiments of the invention provided as non-limitative examples for achieving various aspects of the invention. The description refers to the attached figures which illustrate, also by way of example, an embodiment of the inventions.

DESCRIPTION OF THE INVENTION

For the reader convenience, identical or similar elements bear the same reference over the whole figures set.

In the following, when it is referred to vertical and horizontal, front and rear, or top and bottom, this must be construed by reference to a vehicle in regular operating position.

Figure 1:
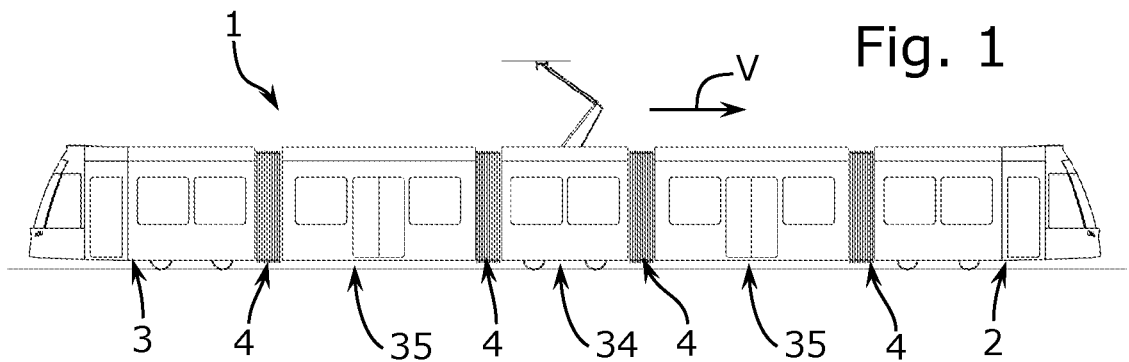
FIG. 1 shows a side view of a streetcar.

FIG. 1 illustrates a streetcar 1 composed of, for example, a front and rear passenger car 2 and 3 connected to one middle passenger car 34 and two middle passenger modules 35. When the streetcar 1 is moving in the direction V, the rear part of the front passenger car 2, of the middle passenger cars 34 or modules 34 or of one of the middle passenger modules 35 is connected to the adjacent front part of the rear passenger car 3, the middle passenger car 34 or middle passenger modules 35. As required, a streetcar may be composed of only one front passenger car 2 connected to one rear passenger car directly or via one middle passenger module 35. Passenger cars or modules 2, 3, 34, or 35 are connected through a gangway bellow 4 which can be in one piece as shown in FIG. 1 or in two gangway bellow halves (not shown) each being fixed to the rear or front part of a passenger car/module. In that case, when two passenger cars/modules are connected together the two facing gangway bellow halves are pressed one against another. In the following, it is referred to passenger cars for simplifying the description but the description applies also to passenger modules.

Figure 2:
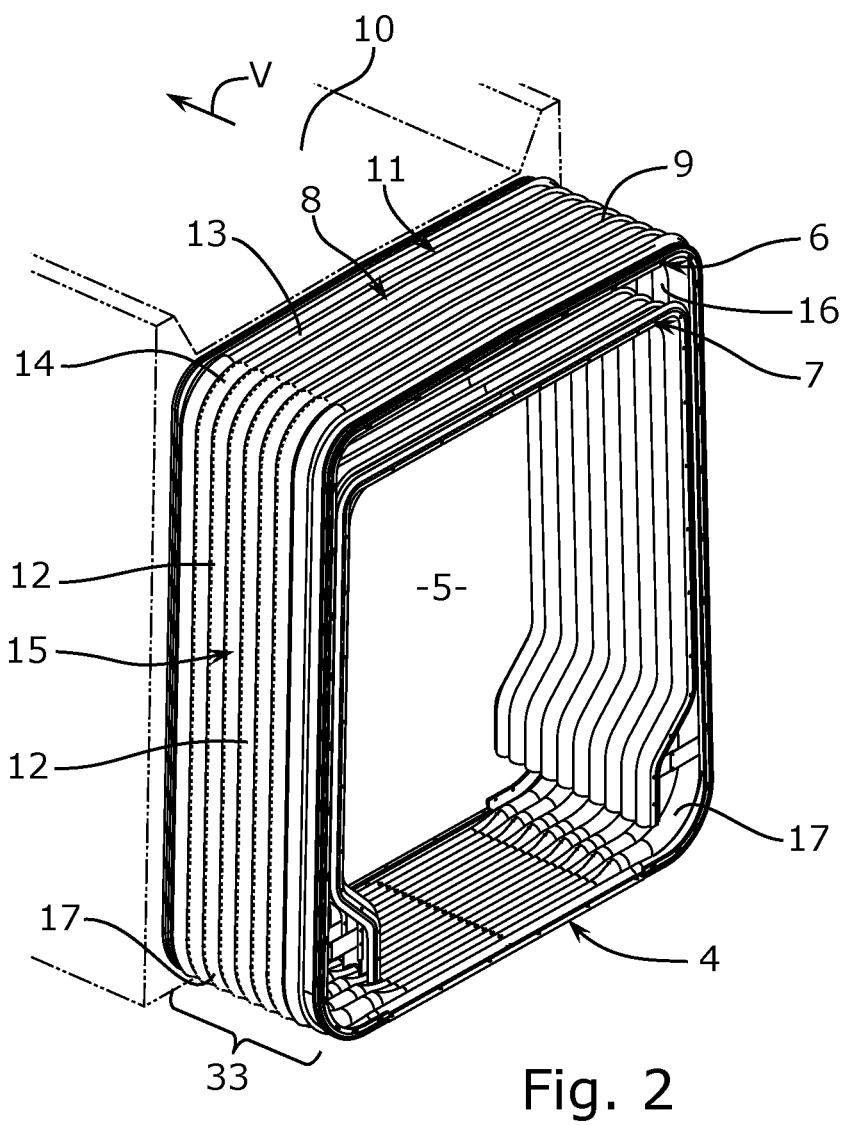
FIG. 2 shows a perspective view from above and from the left of a gangway bellow of the streetcar of FIG. 1 in accordance with an embodiment of the invention.

When the passenger cars 2, 3, or 34 are connected together each gangway bellow 4 forms an entirely or partially closed volume surrounding an articulated gangway 5 linking together the connected passenger cars 2, 3 or 34. Thereby, passengers can move from one passenger car/module to another. As shown in FIG. 2, the gangway bellow 4 comprises an outer bellow 6 surrounding an inner bellow 7. More frequently, gangway bellows are only in one part so that the inner bellow is optional. At least the outer bellow 6 shows corrugations 33 made of a plurality of valleys 8 separated one from another by a plurality of crests 9. Said plurality of valleys 8 and crests 9 are disposed parallelly to each other along the moving direction V.

When the passenger cars 2, 3, or 34 are connected, the gangway bellows 4 surround the articulated gangway 5 so that passengers can move through the articulated gangway 5 in safe and protected conditions irrespectively of the weather outside the streetcar 1. However, when it rains, rainwater dropping on a passenger car roof 10 and on a bellow top 11 tends to accumulate in the valleys 8. In conventional streetcars, rainwater accumulated in the valleys 8 uncontrollably drains off the corrugated bellow top 11 and passengers waiting on platforms (not shown) or passers-by streetcar tracks (not shown) can get wet or dirty from running or splashing rainwater.

In order to control the rainwater drainage from the bellow top 11, at least one drainage channel 12 guides the water flowing from the bellow top 11. One drainage channel 12 is preferably located in each valley 8 of the outer bellow 6. As illustrated in FIGS. 2, the valleys 8 of the outer bellow 6 are extending around the whole or at least a substantial part of the outer bellow 6. Each of the valleys 8 presents a valley top portion 13 facing upwardly. Each of the valleys top portions 13 leads at its ends to a valley top corner 14. Two corrugated bellow sides 15 form the lateral walls of the outer bellow 6 and present valley side portions 16. Each valley side portion 16 is aligned at its superior end with the respective valley top corner 14 and at its inferior end with a valley bottom corner 17.

The drainage channels 12 are shaped like pipes and can be made of the same material as the bellow 4. This material must withstand the movement during vehicle service and fulfills the technical requirements, for example a fabric made from silicone or Hypalon™, or any other adequate material. Preferably, just like the bellow material, the drainage channels 12 material may be flexible so as to adapt to a deformation of the bellow 4 when two adjacent passenger cars (for example, the middle passenger car 34 and one of the middle passenger modules 35) are at an angle from each other, such as when the streetcar 1 is in a curve. The drainage channels 12 are located within their respective valleys 8 to which they are attached by, for example, by being bonded, sewed, or integrally manufactured with the outer bellow 6.

Figure 3A:
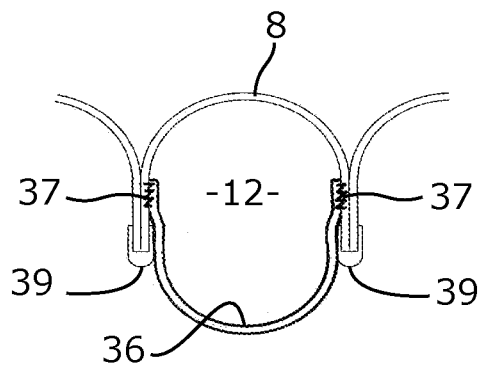
FIGS. 3A and 3B show cross-sectional views of different embodiments of drainage channels according to a cutting plan lying horizontally across the bellow side.
Figure 3B:
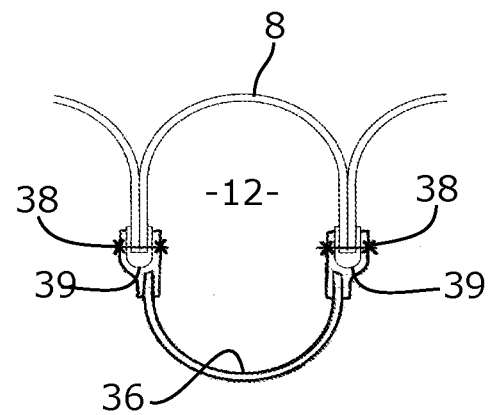

Alternatively, as shown in FIGS. 3A and 3B, the drainage channels 12 may take the form of a section of a pipe by attaching a C section 36 on each side to one crest 9, which, when installed on respective valleys 8, complete a conduit having a closed cross section. As shown in FIG. 3A, the C section 36 is sewed on both lateral parts of one valley 8, see stitching marks 37. Instead of attaching the C sections 36 by sewing, they can be bonded or attached by bolts 38 as shown in FIG. 3B. Each bolt 38 passes through one lateral part of the valleys and a U-shaped end 39 of the respective C section 36. Screws or rivets can also be used for attaching the C sections 36 in place of bolts 38. Alternatively, the drainage channel 12, when formed by a pipe, or the C section 36 can be clamped in the respective valleys 8.

Figure 4:
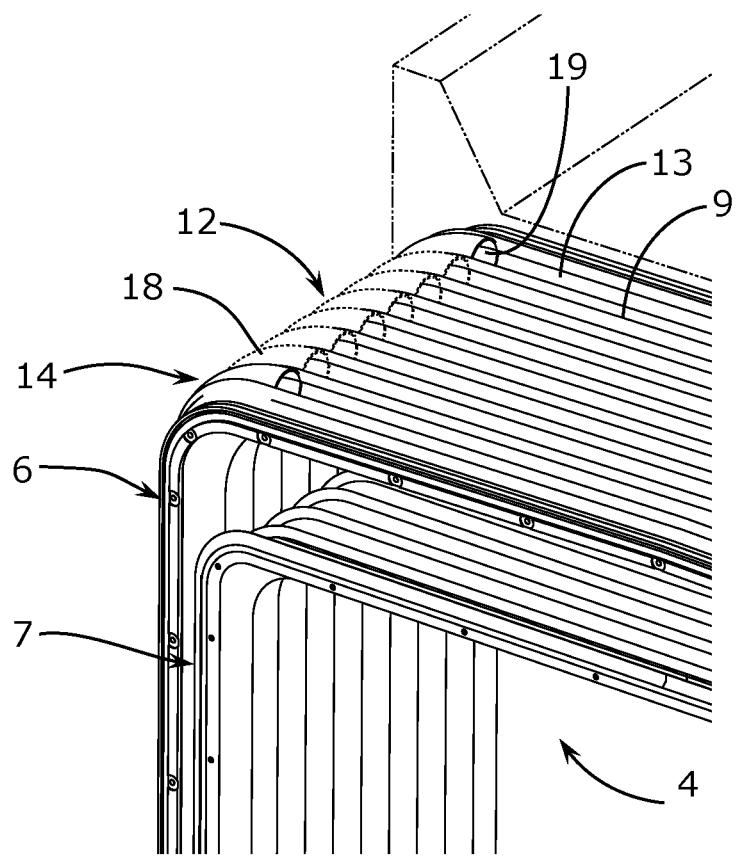
FIG. 4 shows a perspective view from above and from the right of the gangway bellow of FIG. 2 depicting drainage channels with a funneled inlet.

Each drainage channel 12 comprises a top corner portion 18 located within its respective valley top corner 14. The upper end of the top corner portion 18 presents an inlet 19 into which water accumulating in the valley top portion 13 flows for being guided downwardly by the top corner portion 18 of the drainage channel 12 around the valley top corner 14. As shown in FIG. 4, the inlet 19 of the top corner portion 18 may be funneled to facilitate the water flow. The lower end of the top corner portion 18 is optionally connected to the upper end of a straight portion 20 of the drainage channel 12 which extends along the respective valley side portion 16 on the bellow side 15. It should understood that the straight portion 20 is in general substantially straight and it takes the shape of the bellow side 15.

Figure 5:
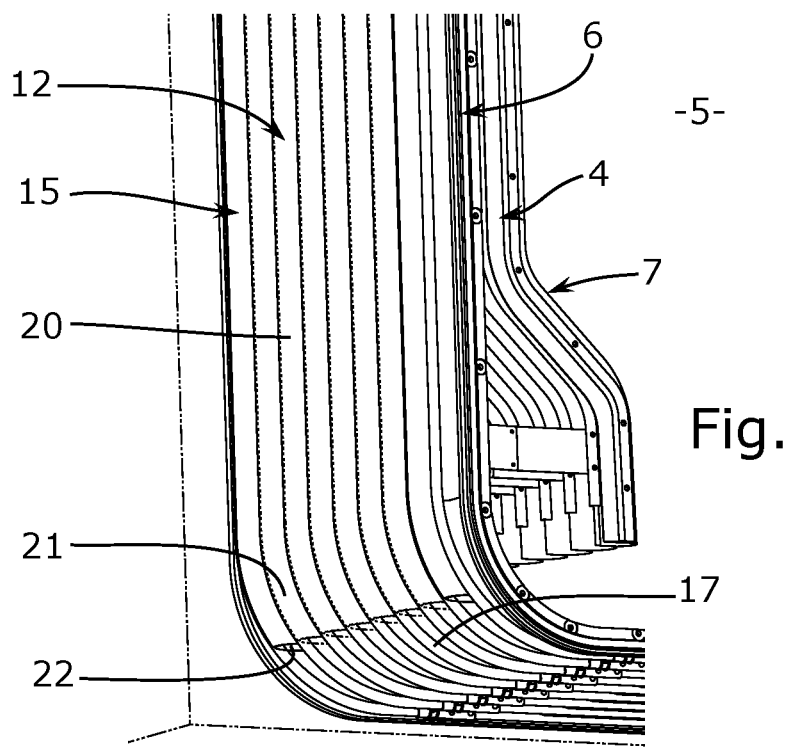
FIG. 5 shows a perspective view from the bottom and from the left depicting a bottom corner of the gangway bellow of FIG. 2.

As shown in FIG. 5, the bottom end of the downwardly extending straight portion 20 of the drainage channel 12 is optionally connected to a bottom corner portion 21 located within the respective valley bottom corner 17. Thereby, the water accumulating on the valley top portions 13 and guided by the inlets 19 can be drained downwardly in a controlled manner through the drainage channel 12 and spilled on the ground through an outlet 22 located at the valley bottom corner 17 of the outer bellow 6 without affecting people standing or walking along the streetcar 1.

In order to facilitate water flowing out of the drainage channel 12, the outlet 22 may be funneled like the inlet 19 of the top corner portion 18 shown in FIG. 4. Alternatively to the embodiment of the drainage channel 12 described above and illustrated in FIGS. 2 to 4, the drainage channel 12 may be deprived of the bottom corner portion 21, or even comprise only the top corner portion 18, as this may be sufficient for guiding downwardly the flow of water accumulating in the valley top portions 13 along the valley side portion 16. Similarly, the straight portion 20 of the drainage channel 12 may extend only along a portion of the side valley sections 16 on the bellow side 15 of the outer bellow 6 (not shown).

Figure 6:
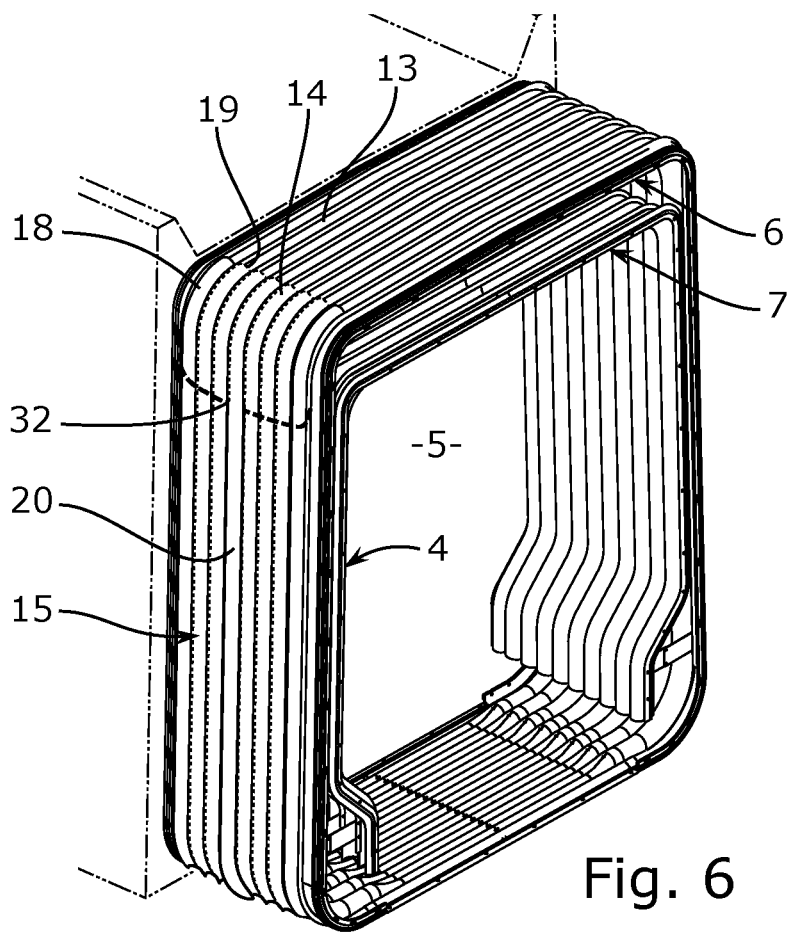
FIG. 6 shows a perspective view from above and from the left of a gangway bellow of the streetcar of FIG. 1 depicting drainage channel with a manifold in accordance with another embodiment of the invention.

In another embodiment of the drainage channel 12 illustrated in FIG. 6, the bottom ends of all or some of the top corner portions 18 located within the valley top corner 14 are connected to a manifold 32 which is connected to a single straight portion 20 extending downwardly along the respective bellow side 15 of the outer bellow 6. Alternatively, the straight portion 20 can be located between the outer bellow 6 and the inner bellow 7. Thereby, the water accumulating on the valley top portions 13 flows in the inlets 19 of the top corner portions 18 and is collected by the manifold 32 for being guided to the straight portion 20 and drained downwardly to the ground. All the top corner portions 18 of an outer bellow 6 are connected to a single manifold 32 for each gangway bellow 4. Alternatively, the bent portions 18 of an outer bellow 6 are grouped into several groups wherein each group of top corner portions 18 is connected to one manifold connected to one straight portion extending downwardly along the respective bellow side 15 of the outer bellow 6 or between the outer bellow 6 and the inner bellow 7 (not shown).

The above description and the figures show different embodiments of the specific aspects of the invention, in particular the structure of the drainage channels and their implementations in the gangway bellow environment of streetcars, they could be configured and implemented in other ways and in different contexts such as, for example, railway cars, light railway vehicles, underground vehicles, or other urban vehicles such as articulated buses.

The invention claimed is:

1. A drainage channel for a gangway bellow comprising corrugations forming at least one valley presenting a valley top portion facing upwardly and at least one valley top corner, wherein the drainage channel is suitable for being located within said at least one valley top corner of said at least one valley and is operative to guide at least partially downwardly liquid accumulating within said valley top portion as it flows through said drainage channel,
wherein the drainage channel comprises:
at least one top corner portion at one end suitable for being located into said at least one valley top corner of said gangway bellow, and
a straight portion extending downwardly from said at least one top corner portion along at least part of a bellow side, and
wherein said straight portion is located within at least part of a valley side portion facing outwardly and extending downwardly from said valley top portion along said bellow side.

2. The drainage channel according to claim 1, wherein said drainage channel further comprises a bottom corner portion extending from a bottom end of said straight portion and suitable for being located within at least a portion of a valley bottom corner.

3. The drainage channel according to claim 1, wherein at least one of two free ends of said drainage channel is funneled.

4. The drainage channel according to claim 1, wherein at least two top corner portions are connected to one straight portion through a manifold so that liquid accumulating on the respective valley top portions flows downwardly through said substantially straight portion along said bellow side.

5. The drainage channel according to claim 1, wherein one top corner portion is connected to a respective substantially straight portion so that liquid accumulating on a valley top portion of said gangway bellow flows downwardly through said top corner portion and said straight portion.

6. The drainage channel according to claim 1, wherein said substantially straight portion is located within a valley side portion aligned with the respective valley top corner, said substantially straight portion being substantially vertically oriented.

7. A gangway bellow comprising an outer bellow presenting corrugations forming a plurality of valleys presenting each a valley top portion facing upwardly and connected at each end to a valley top corner connecting one end of said valley top portion and a bellow side, wherein said gangway bellow comprises at least one drainage channel,
wherein said at least one drainage channel comprises a top corner portion located within at least one of the valley top corners and a substantially straight portion connected to said top corner portion located within at least part of a valley side portion facing outwardly and extending downwardly from said valley top portion along said bellow side so that liquid accumulating into the respective valley top portion flows downwardly through said top corner portion and said substantially straight portion of said at least one drainage channel along said respective bellow side.

8. The gangway bellow according to claim 7, wherein said at least one drainage channel comprises further a bottom corner portion located at a bottom corner of the gangway bellow and connected to a bottom end of said straight portion of the drainage channel so that liquid accumulating into said valley top portion flows out from below the gangway bellow, and wherein an upper end and/or an lower free end of said drainage channel is funneled.

9. The gangway bellow according to claim 7, wherein one drainage channel is located within each valley of the outer bellow from at least an upper part of the valley top corner, through the valley side portion, up to at least said bottom corner of the gangway bellow.

10. The gangway bellow according to claim 7, wherein one top corner portion is located in each valley top corner and several or all top corner portions of the gangway bellow is connected to one straight portion through a manifold portion; and/or said straight portion of the drainage channel is located on the outer bellow.

11. A passenger car wherein the passenger car comprises a gangway bellow according to claim 7, attached to a front and/or a rear part of the passenger car for connecting said passenger car to another passenger car.

\* \* \* \* \*